United States Patent

Schellenbeck et al.

[11] Patent Number: 5,874,497
[45] Date of Patent: Feb. 23, 1999

[54] HOT-MELT ADHESIVES BASED ON ETHYLENE/ALKYL (METH)ACRYLATE COPOLYMER AND ON POLY-ALPHA-OLEFIN AND USES THEREOF

[76] Inventors: Peter Schellenbeck, Rubensallee 6, 55127 Mainz; Markus Krieger, Vogelsbergstrasse 43, 63505 Langensebold; Wolgang Reuss, Neuenhainerstrasse 10, 60326 Frankfurt, all of Germany; Thierry Dreyfus, 304, Rue du Marechal Foch, 60280 Margny les Compiegne, France

[21] Appl. No.: 871,957

[22] Filed: Jun. 10, 1997

[30] Foreign Application Priority Data

Jun. 11, 1996 [FR] France ................................. 96 07235

[51] Int. Cl.$^6$ ......................................... C08J 29/04
[52] U.S. Cl. ................ 524/504; 53/477; 412/8; 524/523; 525/222
[58] Field of Search .................... 524/504, 523; 525/222; 53/477; 412/8

[56] References Cited

U.S. PATENT DOCUMENTS

| | | | |
|---|---|---|---|
| 4,140,733 | 2/1979 | Meyer, Jr. et al. | 260/897 |
| 4,146,521 | 3/1979 | Godfrey | 260/27 |
| 4,460,728 | 7/1984 | Schmidt, Jr. et al. | 524/271 |
| 5,397,843 | 3/1995 | Lakshmanan et al. | 525/240 |
| 5,478,891 | 12/1995 | Lakshmanan et al. | 525/240 |
| 5,512,625 | 4/1996 | Butterbach et al. | 524/490 |

FOREIGN PATENT DOCUMENTS

| | | | |
|---|---|---|---|
| 9063181 | of 1991 | Australia . | |
| 2 271 039 | 6/1994 | France | 123/16 |
| 195 21 396 | 12/1995 | Germany | 123/2 |
| 2290298 | 12/1995 | United Kingdom . | |

OTHER PUBLICATIONS

Encyclop. of Polymer Sci & Eng., vol. 1, p. 561, 1985.

*Primary Examiner*—Melvyn I. Marquis
*Assistant Examiner*—D. Aylward
*Attorney, Agent, or Firm*—Bell, Boyd & Lloyd

[57] ABSTRACT

The invention relates to hot-melt adhesives characterized in that they include: a) 30 to 90% by weight (A) of at least one essentially amorphous poly-alpha-olefin and (B) of at least one ethylene/alkyl (meth)acrylate copolymer, the weight ratio (B)/(A)+(B) being between 0.05 and 0.55; b) 10 to 70% by weight of a tackifying resin; c) 0.1 to 3 parts by weight of an antioxidant for 100 parts by weight of the compounds under a) and b). It also relates to the use of these adhesives in the wood, bookbinding and packaging industries.

9 Claims, No Drawings

HOT-MELT ADHESIVES BASED ON ETHYLENE/ALKYL (METH)ACRYLATE COPOLYMER AND ON POLY-ALPHA-OLEFIN AND USES THEREOF

FIELD OF THE INVENTION

The present invention relates to hot-melt adhesives based on ethylene/alkyl (meth)acrylate copolymer and on poly-alpha-olefin. It also relates to the use of these adhesives in the wood, bookbinding and packaging industries.

BACKGROUND OF THE INVENTION

Industrial adhesive bonding, especially in the wood, bookbinding and packaging sectors, is carried out by means of machines operating at a high output rate, the setting time of the bonding being generally less than a few seconds.

To reach this output rate, it is known to employ hot-melt adhesives which have the property of bonding various materials merely by cooling. These adhesives consist chiefly of a polymer which gives the adhesive its mechanical properties, a tackifying resin with high adhesiveness when hot and, where appropriate, a rheology-modifier such as an oil, a wax, or a plasticizer.

The hot-melt adhesives of the prior art are generally based on a polymer chosen from copolymers of ethylene and of vinyl acetate (EVA), polyamides, poly-alpha-olefins essentially amorphous ("amorphous poly-alpha-olefins" or APAO) and mixtures of APAO and of a copolymer of ethylene and of vinyl acetate or of alkyl (meth)acrylate (see FR-A-2 721 039 and AU-B-63181/90).

However, the adhesives just mentioned exhibit disadvantages in the course of the adhesive bonding in the above-mentioned conditions.

Thus, EVA-based adhesives have a limited temperature strength. For example, in the wood sector the strength is of the order of 80 to 110° C. depending on the nature of the edge employed.

Adhesives containing a polyamide are stable only at a temperature lower than 200° C. and are liable to be degraded by oxidation. In addition, they are high in cost.

Adhesives including an APAO have a slow increase in cohesion, which makes it necessary to lengthen the period of holding the articles under pressure and hence to reduce the output rate. In addition, the bonding frequently includes, downstream of the machine, a stage of in-line cutting of the articles by means of guillotines and/or saws the blades of which are rapidly fouled by incompletely hardened adhesive. Furthermore, these adhesives form threads on coating devices, for example using a roll or intermittent nozzle, and this produces, on the one hand, fouling of the machine and, on the other hand, soiling on the bonded articles.

DESCRIPTION OF THE INVENTION

It has now been found that adhesives including (A) at least one poly-alpha-olefin and (B) at least one ethylene/alkyl (meth)acrylate copolymer in a weight ratio (B)/(A)+(B) of between 0.05 and 0.55 are compatible with a high output rate (short setting time, absence of threads) while retaining the high temperature strength of the APAO-based adhesives.

The subject-matter of the present invention is therefore hot-melt adhesives intended to be employed in machines operating at a high output rate, these adhesives being characterized in that they include:

a) 30 to 90% by weight preferably 70 to 90% (A) of at least one essentially amorphous poly-alpha-olefin and (B) of at least one ethylene/alkyl (meth)acrylate copolymer, the weight ratio (B)/(A)+(B) being between 0.05 and 0.55;

b) 10 to 70% by weight of a tackifying resin;

c) 0.1 to 3 parts by weight of an antioxidant for 100 parts by weight of the compounds under a) and b).

The poly-alpha-olefin (A) is generally chosen from polymers resulting from the solution copolymerization of monomers chosen from ethylene, propene, 1-butene and hexene in the presence of a catalyst of the Ziegler-Natta type and mixtures of these copolymers. An example which may be mentioned is Vestoplast® marketed by Hüls and Eastoflex® marketed by Eastman Chemical. Advantageously, the copolymers employed have a ring-and-ball melting point (DIN standard 52011) of between 85 and 155° C., a glass transition temperature, measured by DSC (DIN standard 53765) of between −10 and −35° C. and a Brookfield viscosity at 190° C. (DIN standard 53019) of between 300 and 250 000 mPa s.

The copolymer (B) is generally chosen from copolymers of ethylene and of alkyl (meth)acrylate in which the linear or branched alkyl radical contains 1 to 8 carbon atoms, and mixtures of these copolymers. An example which may be mentioned is methyl, butyl or octyl (meth)acrylate. Copolymers which are employed preferably have a (meth)acrylic ester content of between 5 and 35%, a melt index (ASTM standard D 1238) of between 1.5 and 500 and a ring-and-ball melting point (DIN standard 52011) of between 78° and 150° C.

The copolymer (B) may also be chosen from ethylene/alkyl acrylate/maleic anhydride terpolymers in which the maleic anhydride content is between 10 and 30 mg KOH/g.

The tackifying resin is generally chosen from the petroleum hydrocarbon resins such as aliphatic resins, for example with a high content in $C_5$, or aromatic resins, for example with a high content in $C_9$ modified or hydrogenated (for example Escorez® 2100, 2500, 5300 or 2100 marketed by Exxon, Hercures® AR 100 marketed by Hercules or Wintack® 95 marketed by Goodyear), synthetic or modified terpene resins (for example Arkon® P 100 marketed by Arakawa or Zonatac® 501 LITE marketed by Arizona) and the resins derived from rosin, especially the glycerol esters (for example Staybilite® Ester 10, Foral® 85 marketed by Hercules) or pentaerythritol esters (for example Pentalyn® H marketed by Hercules).

The antioxidant is generally chosen from hindered phenols (for example Irganox® 1010 marketed by Ciba Geigy or Ralox® LC marketed by Raschig), hindered amines (for example Naugard® 445 marketed by Uniroyal Chemicals) and mixtures of a hindered phenol and of a thioester (for example Santonox® marketed by Monsanto). A hindered phenol is preferably employed.

The compositions according to the invention may additionally contain the following additives:

a viscosity regulator (0–55% by weight) chosen from:
waxes, especially polyethylene waxes (for example Vestowax® A227 or A616 marketed by Hüls), waxes originating from the Fischer-Tropsch synthesis (for example Sasolwax® marketed by Sasol or Vestowax® SH 105 marketed by Hüls), microcrystalline waxes (for example Vestowax® 520 marketed by Hüls), polypropylene waxes, especially atactic polypropylenes, homopolymers and random or block copolymers of high melt index (for example Vestolen® P marketed by Hüls). The waxes preferably have a melting point of between 150 and 165° C. and a viscosity value (ISO standard 1191) of between 150 and 500 cm³/g;

plasticizers such as polyisobutene of molecular weight of between 500 and 2000 (for example Indopol® marketed by Amoco or Napvis® marketed by BP) and phthalates;

a filler (0–60% by weight) such as calcium carbonate or barium sulphate, optionally in the presence of a whitener such as a titanium or zinc oxide;

a copolymer (0–50% by weight) chosen from copolymers of ethylene and of vinyl acetate and styrene/butadiene/styrene, styrene/isoprene/styrene or styrene/butene/ethylene/styrene block copolymers. A copolymer of ethylene and vinyl acetate is preferably employed.

The preparation of the hot-melt adhesives according to the invention can be carried out according to the techniques which are known to a person skilled in the art, for example in a stirred and heated mixer such as a spherical apparatus of the Turbosphere® type marketed by Moritz, a mixer of the Z-blade type or a continuous extruder.

The hot-melt adhesives thus obtained can be in the form of granules, beads, pellets or blocks.

The hot-melt adhesives according to the invention are particularly advantageous in the field of adhesive bonding of wood.

In a first, preferred, alternative form, the adhesives of the invention are employed for bonding edges onto panels of various kinds.

To implement this bonding the adhesive is placed in a melt kettle at a temperature of the order of 200° C., connected to the coater roll of a machine for veneering edges. The adhesive rises along the vertical roll. In contact with the roll the side of the panel is coated with hot adhesive and the edge is applied thereto and is held by pressure for a short moment of the order of a second, or even less. On leaving the machine, the edge is cut to the length of the panel.

The bonding is carried out continuously with a speed of travel of the panels on the machine which can reach 150 meters per minute, or even more.

The panels are generally chosen from wood chip panels, MDF (medium density fibreboard) panels and reconstituted wood panels.

The edges are generally chosen from edges made of acrylonitrile/butadiene/styrene (ABS) copolymer, polyvinyl chloride (PVC), or wood or melamine laminate. The thickness of the edges can vary to a wide extent, for example from 0.1 to 5 mm.

In a second alternative form the adhesives of the invention are employed for bonding flexible decorative supports onto sections or flat supports of large area and with curved sides (so-called soft-forming technique).

The bonding is carried out on an edge-veneering machine modified in that the support is laid flat onto the section by means of positioning rollers.

The sections are generally wood chip panels made of wood or of MDF.

The decorative supports are generally of the same kind as the abovementioned edges, their thickness, however, being smaller, of the order of 0.05 to 1 mm.

The adhesives according to the invention can also be employed in the bookbinding industry, especially for the manufacture of books, journals, catalogues and directories.

The bonding is in most cases carried out on a machine with a continuously operating roundabout. The pages to be bound are placed between clamps and the cut edge is "sawn" with a cutter in order to create indentations and allow the adhesive to enter between the pages. After a brushing operation, the pages come successively into contact with two coating rolls which turn in the direction of travel of the pages and with a third roll which turns in the opposite direction to the said travel and which removes the excess adhesive. The cover of the book is deposited on a movable tray, placed in contact with the adhesive-coated cut edge and shaped under pressure. The book is released from the clamp and its sides are cut in line with the aid of guillotines and saws.

The process makes it possible to manufacture of the order of 3000 to 12 000 books per hour. The time which elapses between the bonding and the guillotining is in most cases less than one minute.

The adhesives according to the invention can also be employed in the field of packaging, for example for manufacturing cardboard boxes and cases, for forming flexible bags and cases or labelling preserves.

The nature of the supports that can be bonded is very varied.

Untreated, oil-repellent or water-repellent papers and cardboards, plastics and metals may be mentioned by way of illustration.

The bonding is generally carried out continuously in machines which are known to a person skilled in the art, which machines comprise chiefly a melting tank for the adhesive, an adhesive-coating device and a device for placing the parts to be bonded in contact with each other.

The adhesive-coating device may in particular comprise a coater roll, a coater disc, a coating, spraying or fibring nozzle or a lip nozzle.

In all cases the output rate of the machines is high, of the order of 1000 to 15 000 articles per hour.

EXAMPLES

The examples which follow make it possible to is illustrate the invention.

Examples 1 to 5

Preparation of hot-melt adhesives

The following compounds are introduced into a mixer heated to 190° C.:

A—Vestoplast® 408 (ethylene/propene/butene copolymer rich in butene; viscosity at 190° C. (DIN 53019): 8000 mPa s; ring-and-ball melting point (DIN 52011): 107° C.; marketed by Hüls).

B—Vestoplast® 750 (ethylene/propene/butene copolymer rich in propene; viscosity at 190° C. (DIN 53019): 50 000 mPa s; ring-and-ball melting point (DIN 52011): 107° C.; marketed by Hüls).

C—Lotryl® 30 BA 02 (ethylene/n-butyl acrylate copolymer; n-butyl acrylate content: 30%; melt index: 2 g/10 min (ASTM D 1238); marketed by Elf Atochem S.A.).

D—Escorez® 5380 (hydrogenated cyclic resin; ring-and-ball melting point: of the order of 85° C.; marketed by Exxon).

E—Vestolen® P 2000 (polypropylene wax, melting point (DIN 53 736 B2): 165° C.; melt index (ISO 1133, conditions 18=70 g/min; marketed by Hüls).

F—Titanium oxide RL 68 (rutile-type oxide marketed by Thann and Mulhouse—France).

G—Ralox® LC (antioxidant of the hindered phenol type, marketed by Raschig).

The quantities of the abovementioned compounds, expressed in parts by weight and the Brookfield viscosity at 200° C. (ASTM standard D3236) and the ring-and-ball melting point (DIN 52011) are shown in the following Table 1:

TABLE 1

| COMPOUND | 1 | 2 | 3 | 4 (comparative) | 5 (comparative) |
|---|---|---|---|---|---|
| A | 42.5 | 35 | 25 | 50 | 15 |
| B | 42.5 | 35 | 25 | 50 | 15 |
| C | 15 | 30 | 50 | 0 | 70 |
| D | 30 | 30 | 30 | 30 | 30 |
| E | 8 | 8 | 9 | 8 | 8 |
| F | 2 | 2 | 2 | 2 | 2 |
| G | 0.1 | 0.1 | 0.1 | 0.1 | 0.1 |
| Viscosity (mPa s) | 29 600 | 39 000 | 138 000 | 16 100 | 600 000 |
| Melting point (°C.) | 157 | 158 | 157 | 156 | 159 |

Examples 6 to 10
Application to the adhesive bonding of edges

The adhesives according to Examples 1 to 5 are used in a machine for veneering edges on a wood chip panel 40 cm in length and 19 mm in thickness. The adhesive is deposited at 200° C. at a rate of 130–160 g/m², at a speed of 20 m/minute, onto which is applied an edge made of ABS (thickness: 3 mm; Raukantex ABS marketed by Rehau—Germany), of PVC (thickness: 3 mm; Raukantex PVC marketed by Rehau—Germany) or of melamine laminate (thickness: 0.9 mm, marketed by Duropal).

At the end of the bonding the excess width of the edge is milled off and the panel is cut to the following dimensions: length: 360 mm; width: 35 mm; thickness: 19 mm. Each item thus cut comprises a bonded edge of 360×19 mm.

The following methods were used to evaluate the performance of the adhesives of Examples 1 to 5:

a—Melting behaviour

The speed of melting of the adhesive, which must be high in the case of machines operating at a high output rate, is measured by placing a metal beaker containing 300 g of adhesive in a block of aluminium hollowed out to the dimensions of the beaker, the block being heated to 200° C. The melting behaviour is marked as follows:

| 1 - Very good = | very high speed of melting (<3 minutes) |
| 2 - Good = | high speed of melting (3 to 5 minutes) |
| 3 - Satisfactory = | sufficient speed of melting (5 to 7 minutes) |
| 4 - Mediocre = | can present problems on the machine (7 to 10 minutes) |
| 5 - Deficient = | speed of melting insufficient to follow the output rate of the machine (>10 minutes). | b—Threading of the adhesive

The evaluation of the threading of the adhesive is carried out by observing the formation of threads on the coater roll of the machine and their transfer onto the particle board when the edge is being adhesively bonded.

The threading is marked as follows:

| 1 - Very good = | no threads |
| 2 - Good = | very few thin threads |
| 3 - Satisfactory = | few thin threads |
| 4 - Mediocre = | presence of thick threads |
| 5 - Deficient = | many thick threads, soiling of the rollers of the veneering machine. | c—Assembly time

An edge is applied manually every 5 seconds onto a panel coated with adhesive by means of the veneering machine described above (adhesive temperature: 200° C.; deposition: 130–160 m²/g). The assembly time, expressed in seconds, is the time after which the edge no longer bonds to the panel.

d—Increase in cohesion

The increase in cohesion is determined by manual peeling of the edge on leaving the machine.

| 1 - Very good: | >5 N/mm |
| 2 - Good: | 4 to 5 N/mm |
| 3 - Satisfactory: | 2 to 4 N/mm |
| 4 - Mediocre: | 1 to 2 N/mm |
| 5 - Deficient: | <1 N/mm | e—Peel strength

Peeling of the article coated with adhesive at 90° C. is carried out at a pulling speed of 100 mm/min.

The results are expressed in N/mm. A peel strength lower than 2 N/mm is considered to be insufficient.

f—Evaluation of the wetting (adhesion)

The determination of the nature of the adhesion of the adhesive to the panel is performed by peeling the adhesively bonded article after 24 hours' bonding. A rupture of the cohesive type is looked for.

The adhesion is defined as follows:

| 1 - Very good = | more than 75% of tearing in the panel |
| 2 - Good = | from 50 to 75% of tearing in the panel |
| 3 - Satisfactory = | from 25 to 50% of tearing in the panel |
| 4 - Mediocre = | less than 25% of tearing in the panel |
| 5 - Deficient = | no tearing in the panel | g—Temperature strength

The item coated with adhesive is placed in an oven at 50° C. for one hour. Every hour the temperature is raised by 10° C. up to a maximum of 130° C. The temperature strength is the temperature at which the debonding of the edge is observed.

The performance results of the adhesives of Examples 1 to 5 are shown in Table 2 (Examples 6 to 10 respectively).

TABLE 2

| EXAMPLE | 6 | 7 | 8 | 9 (comparative) | 10 (comparative) |
|---|---|---|---|---|---|
| a - Melting | 1 | 1 | 3 | 1 | 5 |
| b - Threading | 3 | 1 | 1 | 5 | 1 |
| c - Assembly time (s) | 10–20 | 10–20 | <10 | >30 | <10 |
| d - Cohesion | 2 | 1 | 3 | 5 | 3 |
| e - Peeling (N/mm) | | | | | |
| ABS edge | 6.2 | 6.6 | 4.7 | 4.2 | 4.2 |
| PVC edge | 7.0 | 7.7 | 4.9 | 4.4 | 4.4 |
| f - Adhesion | 2 | 2 | 3 | 2 | 5 |

TABLE 2-continued

| EXAMPLE | 6 | 7 | 8 | 9 (comparative) | 10 (comparative) |
|---|---|---|---|---|---|
| g - Temperature strength (°C.) | | | | | |
| ABS edge | 120 | 120 | 120 | 110 | 120 |
| PVC edge | 120 | 120 | 110 | 120 | 110 |
| Melamine edge | 120 | 120 | 100 | 100 | 90 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Hot-melt adhesive comprising:
   a) 30 to 90% by weight (A) of at least one essentially amorphous poly-alpha-olefin and (B) of at least one ethylene/alkyl (meth)acrylate copolymer, the weight ratio (B)/(A)+(B) being between 0.05 and 0.55;
   b) 10 to 70% by weight of a tackifying resin;
   c) 0.1 to 3 parts by weight of an antioxidant for 100 parts by weight of the compounds under a) and b) wherein the viscosity of the adhesive is between about 29,600 and about 138,000 mPas at 200° C. per ASTM standard D3236.

2. Adhesive according to claim 1, wherein the ratio is between 0.10 and 0.40.

3. Adhesive according to claim 1, wherein the poly-alpha-olefin is a copolymer of ethylene and/or of propene and/or of 1-butene and/or hexene, or a mixture of these copolymers.

4. Adhesive according to claim 1, wherein the alkyl radical contains 1 to 8 carbon atoms.

5. Adhesive according to claim 4, wherein the radical is methyl, butyl and octyl.

6. Method for bonding wood, comprising adhering wood with an adhesive according to claim 1.

7. Method according to claim 6 wherein edges or decorative supports are laminated.

8. Method for bookbinding comprising binding books, journals, catalogues or directories with the adhesive of claim 1.

9. Method for the manufacture of packaging comprising adhering boxes, cases and bags and for bonding labels with the adhesive of claim 1.

* * * * *